United States Patent [19]

Atanasoff et al.

[11] E Patent Number: Re. 32,094

[45] Reissued Date of Patent: Mar. 25, 1986

[54] OVERFLYING MUNITIONS DEVICE AND SYSTEM

[75] Inventors: John V. Atanasoff, East Greenwich, R.I.; W. Kenneth Clark, Lowell, Mass.; David Henderson, Carlisle, Mass.; Kenneth W. Wreghitt, Andover, Mass.

[73] Assignee: Avco Corporation, Wilmington, Mass.

[21] Appl. No.: 666,870

[22] Filed: Oct. 31, 1984

Related U.S. Patent Documents

Reissue of:

[64] Patent No.: 4,356,770
Issued: Nov. 2, 1982
Appl. No.: 92,898
Filed: Nov. 9, 1979

[51] Int. Cl.[4] ..... F42B 25/24

[52] U.S. Cl. ..... 102/384; 102/394; 244/3.23

[58] Field of Search ..... 102/384, 386, 388, 393, 102/475, 476, 489, 213, 214; 244/3.1, 3.23

[56] References Cited

U.S. PATENT DOCUMENTS

| | | | |
|---|---|---|---|
| 2,925,965 | 2/1960 | Pierce | 102/213 |
| 3,264,985 | 8/1966 | Reed | 102/388 |
| 3,380,687 | 4/1968 | Wrench et al. | 102/393 |
| 3,818,833 | 6/1974 | Throner, Jr. | 102/393 |
| 4,050,381 | 4/1977 | Heinemann | 102/476 |
| 4,160,415 | 7/1979 | Cole | 102/475 |
| 4,172,407 | 10/1979 | Wentick | 102/489 |
| 4,242,962 | 1/1981 | Wakeman et al. | 102/213 |
| 4,264,045 | 4/1981 | Campbell | 102/489 |
| 4,492,166 | 1/1985 | Purcell | 102/384 |

FOREIGN PATENT DOCUMENTS

| | | |
|---|---|---|
| 1193304 | 5/1970 | United Kingdom . |
| 1298931 | 12/1972 | United Kingdom . |
| 1444029 | 7/1976 | United Kingdom . |
| 1477097 | 6/1977 | United Kingdom . |
| 1545148 | 5/1979 | United Kingdom . |
| 2006400 | 5/1979 | United Kingdom . |
| 2006935 | 5/1979 | United Kingdom . |
| 2039445 | 8/1980 | United Kingdom . |

*Primary Examiner*—Charles T. Jordan
*Attorney, Agent, or Firm*—Charles M. Hogan; Abraham Ogman

[57] ABSTRACT

In a munitions system, a cylindrical canister is fired over a target. The canister carries a target sensing infrared device and, when a target is detected, a projectile is fired downward from the bottom of the overflying missile. A spinning motion is imparted to the missile to stabilize its flight, and a wobbling motion is imparted to the missile to provide a larger target area. The projectile forms a concave lower end to the missile and is fired by an explosive charge.

31 Claims, 10 Drawing Figures

OVERFLYING MUNITIONS DEVICE AND SYSTEM

Matter enclosed in heavy brackets [ ] appears in the original patent but forms no part of this reissue specification; matter printed in italics indicates the additions made by reissue.

DESCRIPTION

1. Technical Field

This invention relates to a munitions system and submunition which may be used in ground-to-ground or air-to-ground tactical warfare situations against armored vehicle targets. The subject submunition includes a missile containing a projectile.

2. Background Art

Conventional munitions designed to counter armored vehicles include both ground and air-launched projectiles which must impact the target to be effective. Accuracy of the initial launch conditions of elevation, azimuth and velocity, coupled with subsequent aerodynamics effects during the trajectory to the target, dominate the performance of these munitions. Guided munitions do not rely so heavily on the accuracy of initial launch conditions but are generally more complex and costly and potentially [vulnerably] *vulnerable* to enemy countermeasures.

An object of the present invention is to provide a submunition which is both effective and relatively inexpensive as compared to guided systems yet which offers the opportunity to search for and engage a target during its flight.

DISCLOSURE OF THE INVENTION

In accordance with the invention, a submunition overflies a target area following a ballistic path in a manner similar to that of a clay pigeon or "Skeet" at a shooting range. The munition carries a downward directed projectile such as a Miszray Schardin type warhead commonly known as a self-forging fragment warhead. Preferably the submunition is configured as a short cylinder, the length to diameter ratio being governed by a number of system considerations. Means such as spin imparted to the submunition provides stability during flight with the projectile directed downward. An infrared sensor or other target sensing device is embodied on the submunition to trigger the firing of the warhead when an appropriate signal is received. To increase the ground area scanned by the sensing element, a wobbling or precession motion is imparted to the submunition during its flight if such motion is warranted by the engagement scenario.

Launch of the submunition along its trajectory may be accomplished by explosive or rocket propelled ejection from a suitable launch tube or by centrifugal forces imparted by spinning of a munition delivery vehicle about an axis parallel to but offset from the munition spin axis. In the latter case, the munition receives both spinning and lateral displacement motion. Other methods of imparting spin are by a strap, a pin/groove arrangement, a friction band or rack and pinion. Wobbling motion may be imparted by an off-center bobweight or a small explosive coning charge.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

BEST MODE OF CARRYING OUT THE INVENTION

Figure 1:
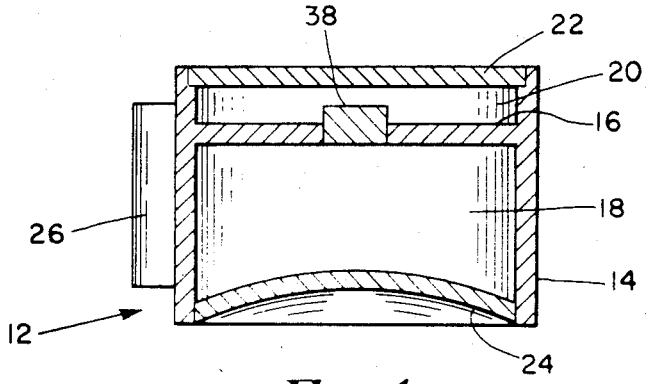
FIG. 1 is a cross-sectional view of a submunitions device embodying this invention.
Figure 2:
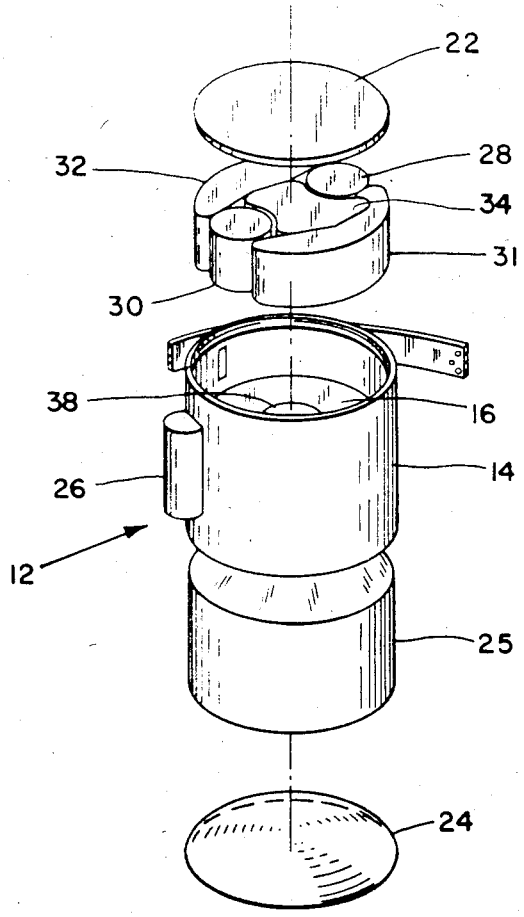
FIG. 2 is an exploded view of the submunitions device of FIG. 1.

As shown in FIG. 1 and the exploded view of FIG. 2, a missile 12 is in the form of a canister having a cylindrical warhead housing 14. The housing 14 is separated into an explosive charge chamber 18 and an electronics chamber 20 by a recessed floor 16. Electronics in the chamber 20 are covered by a flat, end plate 22. The opposite end of the canister missile 12 is closed by a lens 24. The metal lens 24 retains an explosive charge 25 in the chamber 18 and serves as a projectile when the explosive charge is ignited.

Similar lens projectiles are used in conventional mines and the like but are directed upward. The lens is termed self-forging because, when fired, the explosive charge inverts the curvature of the lens so that the lens becomes a bullet shaped projectile. With the present arrangement, the lens 24 is directed downward to provide a concave lower end to the submunition. With the cylindrical housing 14 and flat end plate 22 the lens provides an inverted saucer configuration. The spinning inverted saucer has high stability in flight and is a source of additional lift to the missile. The stability of the spinning missile insures that the projectile, lens 24, is directed downward along the entire missile trajectory.

To senses a target, an infared target detection device with optics 26 is mounted to the outside of the housing 14. The target detection device might also be mounted within the housing. Within the electronics chamber 20, two batteries 28 and 30 serve as the power supply. Target detection electronics 31 and 32 analyze the signals received from the infrared detector and distinguish between a target, such as an armored vehicle, and background. Other suitable target detectors may, for example, be of the magnetic, optical or audio type.

A safing and arming device 34 is provided to prevent ignition of the explosive charge 25 until the safing and arming device detects the translational and angular acceleration of the missile when it is fired. To initial firing of the explosive charge 25, a precision initiater coupler 38 is provided. This initiater coupler is a small charge which is ignited upon detection of a suitable target.

Figure 3:
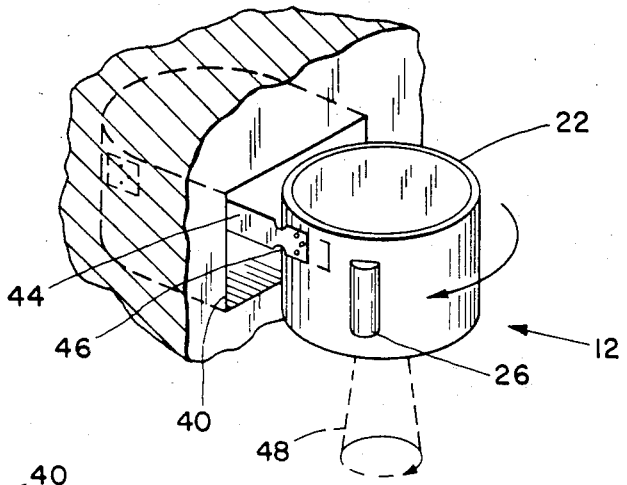
FIG. 3 shows the submunition missile of FIGS. 1 and 2 as it is launched from a launching tube.
Figure 4:
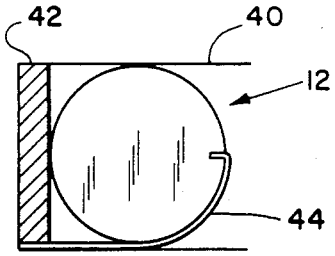
FIG. 4 is a plan view of the missile positioned in the launching tube of FIG. 3 and showing the strap for imparting spin to the missile with firing.

In use, the missile is propelled from a launching device such as shown in FIGS. 3 and 4 at a velocity of 100 to 200 feet per second to ranges of several hundred feet. The launcher is a rectangular tube 40 from which the missile 12 is fired by an explosive charge 42. To impart spin to the missile 12 about a vertical axis, a frangible strap 44 is fixed at one end to the firing tube and wrapped partially around the missile 12. The opposite end of the strap is fixed to the missile by rivets. This strap has notches 46 formed adjacent the rivets so that, as the missile leaves the tube 40, the strap breaks to disconnect the missile from the tube.

Figure 5:
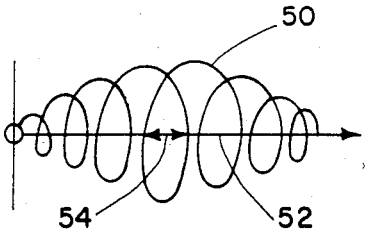
FIG. 5 shows a trace of the ground area subject to attack by a wobbling, spinning missile.

It can be noted in FIG. 3 that the strap is attached to the missile above the center of gravity. This imparts a torque in a roll plane as the strap is released. As a result, the missile spins off with precession, that is with a wobbling motion. With wobbling of the missile, the submunition scans the ground and can fire upon a larger area. This larger area is indicated by the coning action shown at 48 in FIG. 3 and by the target area with flight shown in FIG. 5. As the distance of the missile above ground increases and then decreases along its trajectory, the ground which is scanned by the infrared detector and to which the projectile 24 is directed is as shown at 50 in FIG. 5. Without wobble, the ground scanned is along a single straight line 52. It can thus be seen that the target area, or footprint, of the missile is much greater with spin and wobble. With such a large target area determined by the entire missile trajectory and the extent of the wobble, the missile need not be fired directly to, or even directly over, a target. This greatly reduces the accuracy required for single shot firing of a cannon or mortar, and it reduces the number of devices which must be fired with random firing. Because fewer devices must be fired, each device can be provided with increased munitions capacity. Also, the projectile 24 is fired directly or almost directly downward onto the target. The top of the target is often its most vulnerable side.

To insure that any target within the footprint of the missile be detected, the maximum interscan spacing 54 in the firing path 50 must be less than the expected target width. To that end, the spin rate must be sufficient for a given velocity of the missile.

Figure 6:
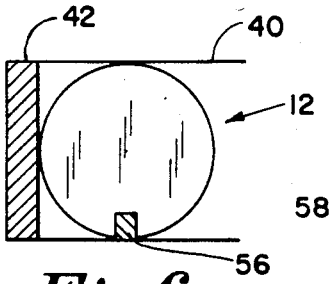
FIG. 6 is a plan view similar to FIG. 4 but showing an alternative embodiment for imparting spin to the missile by an off-center weight.

Other means for imparting spin to the missile are shown in FIGS. 6–9. In FIG. 6, a weight 56 increases the inertia on that side of the missile. That side thus has a slower acceleration, and spin is imparted.

Figure 7:
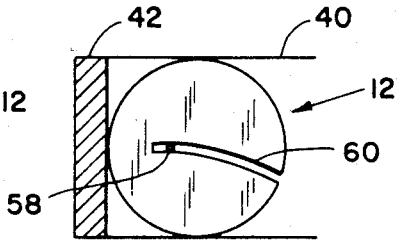
FIG. 7 is a plan view of another embodiment of imparting spin to the missile by a pin and groove.

In FIG. 7, a pin 58 on the missile is guided by a groove 60 in the launching tube 40. When the missile is fired, the pin follows the groove and thus imparts spin. The groove may be opened at its terminal end or the pin may be frangible. Alternatively, the groove may be in the missile and the pin may be secured to the launching tube 40.

Figure 9:
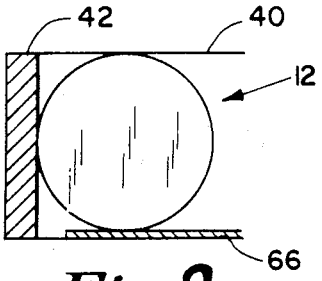
FIG. 9 is still another means of imparting spin including a friction surface.
Figure 8:
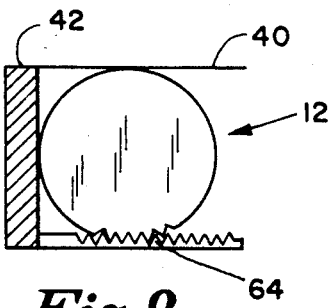
FIG. 8 is a plan view of yet another embodiment for imparting spin including a rack and pinion.

In FIG. 9, complementary teeth on the missile and in the launching tube 40 provide a rack and pinion effect. And in FIG. 8 a high friction surface 66 to one side of the launching tube 40 provides a similar effect.

Figure 10:
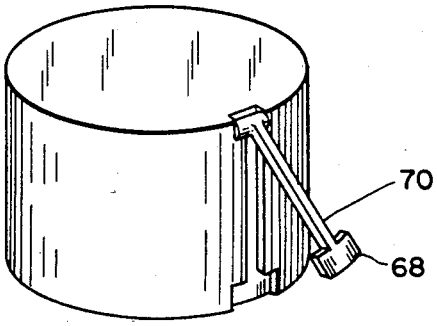
FIG. 10 is a perspective view of an alternative embodiment of the munitions device with means for imparting wobble to the spinning missile.

Rather than by placing the spin imparting means off center, wobble can be separately induced. For example, a small coning charge may be fired after the missile has been launched. The charge would be positioned on the missile to provide torque in a roll plane. FIG. 10 shows another means for imparting wobble to the spinning missile. A bob 68 is positioned at the end of a hinged support arm 70 such as a rod or a flexible line. After the missile is launched centrifugal force from the spin of the missile causes the bob to swing outwardly. Since the arm is connected off center, the missile wobbles. The frequency of the wobble can be changed by adjusting the length of the arm 70.

In each of the embodiments described, the missile 12 is fired over a target. When the target is sensed, the explosive charge 25 carried by the missile is ignited and a projectile 24 is propelled downward onto the target. As already noted, in many cases the top of a target is more vulnerable than the front or sides. Thus, a projectile fired from above has greater effect. Also, the trajectory of the missile is not significant so long as the target is in the target area of FIG. 5.

It should be recognized that the projectile 24 may be of any type. For example, it may be solid or fragmentary, and it may carry its own explosive charge.

The missile need not be launched by means of an explosive charge. For example, a centrifugal release of the missile is feasible. Also, the launcher need not be located on the ground. It may, for example, be dropped by parachute with a plurality of missiles launched as the launcher falls toward the ground.

While the invention has been particularly shown and described with reference to preferred embodiments thereof, it will be understood by those skilled in the art that various changes in form and details may be made therein without departing from the spirit and scope of the invention as defined by the appended claims.

We claim:

1. A munitions system comprising:

a missile having a projectile mounted for downward firing from the bottom of the missile;

means for propelling the missile along a *ballistic* trajectory to overfly a target;

stabilizing means for stabilizing the missile in flight with the projectile directed downward;

means for imparting a lateral precession motion to the missile relative to the [target] *trajectory;* detector means carried by the missile for detecting a target below the missile; and means carried by the missile for propelling the projectile downward from the missile toward the target upon detection of the target.

2. A munitions system as claimed in claim 1 wherein the stabilizing means includes means for imparting spin to the missile about a near vertical axis.

3. A munitions system as claimed in claim 2 wherein the detector means is an infrared detector.

4. A munitions system as claimed in claim 1 wherein the means for imparting precession is an offcenter bob extending outwardly from the spinning missile.

5. A munitions system as claimed in claim 1 wherein the means for imparting precession is an explosive charge.

6. A munitions system as claimed in claim 2 wherein the missile is a cylindrical canister.

7. A munitions system as claimed in claim 6 wherein the cylindrical canister carries an explosive charge for propelling the projectile downward from the bottom end of the canister.

8. A muntions system as claimed in claim 7 wherein the projectile is a lens which forms a concave lower end to the missile.

9. A munitions system as claimed in claim 8 wherein the projectile is a self-forging device.

10. A munitions system as claimed in claim 6 wherein the missile has a concave bottom end.

11. A munitions system as claimed in claim 2 wherein the means for imparting spin to the missile is a disconnectable strap attached to the missile and to the means for propelling the missile.

12. A munitions system as claimed in claim 2 wherein the means for imparting spin to the missile is an off-center weight.

13. A munitions system as claimed in claim 2 wherein the means for imparting spin to the missile is a pin and groove connection between the missile and the means for propelling the missile.

14. A munitions system as claimed in claim 2 wherein the means for imparting spin to the missile is a high friction surface between the missile and the means for propelling the missile.

15. A munitions system as claimed in claim 2 wherein the means for imparting spin to the missile is a rack and pinion connection between the missile and the means for propelling the missile.

16. A munitions system as claimed in claim 1 wherein the means for sensing the target is an infrared detector.

17. A munitions system as claimed in claim 1 wherein the missile carries an explosive charge for propelling the projectile downward from the missile.

18. A munitions system as claimed in claim 17 wherein the projectile is a self-forging lens which forms a concave lower end to the missile.

19. A [submunition] *munition* to be launched along a *ballistic* trajectory to overfly a target, the [submunition] *munition* including:

a generally circular missile to be propelled over a target with a spinning motion about a near vertical axis;

means for imparting a lateral precession motion to the missile relative to the [target] *trajectory;* a projectile carried by the missile and to be fired downward from the bottom of the missile toward the target;

detector means carried by the missile for detecting the target; and means for propelling the projectile downward from the bottom of the missile upon detection of a target.

20. A *submunition*] *munition* as claimed in claim 19 wherein the means for sensing a target is an infrared detector.

21. A [submunition] *munition* as claimed in claim 19 wherein the means for propelling the projectile is an explosive charge.

22. A [submunition] *munition* as claimed in claim 21 wherein the projectile is a lens which forms a concave lower end to the missile.

23. A [submunition] *munition* as claimed in claim 22 wherein the projectile is a self-forging device.

24. A [submunition] *munition* as claimed in claim 19 wherein the [submunition] *munition* has a concave lower end.

*25. In a munition system for propelling a munition along a ballistic trajectory, housing means characterized by stable flight relative to an axis transverse to the trajectory when propelled along said trajectory, and means for imparting to the housing lateral precessional motion relative to said trajectory.*

*26. A munition system as defined in claim 25 wherein the means for imparting precession is an off-center bob extending outwardly from the housing.*

*27. A munition system as claimed in claim 25 wherein the means for imparting a precession is an explosive charge.*

*28. A munition system as defined in claim 25 wherein the housing is cylindrical.*

*29. A munition system as defined in claim 25 wherein the means for imparting precession imparts a torque in a roll plane.*

*30. A munition system as defined in claim 25 wherein the housing is characterized by rotational stability about a vertical axis.*

*31. In a munition system for propelling a munition along a ballistic trajectory to overfly a target zone, the combination of:*

*housing means characterized by spin about an axis transverse to said trajectory when propelled along said trajectory;*

*means for imparting to the housing means lateral precessional motion relative to said trajectory; and*

*detector means having a field of view and carried by said housing means for scanning to sense a target in said field.*

* * * * *

UNITED STATES PATENT AND TRADEMARK OFFICE

CERTIFICATE OF CORRECTION

PATENT NO. : RE 32,094

DATED : March 25, 1986

INVENTOR(S) : John V. Atanasoff, W. Kenneth Clark, David Henderson, and Kenneth W. Wreghitt It is certified that error appears in the above-identified patent and that said Letters Patent are hereby corrected as shown below:

Column 2, line 59, please change "senses" to --sense--

Column 3, line 4, please change "initial" to --initiate--

Column 6, line 5, please add a left bracket before the word "submunition"

Signed and Sealed this

Seventh Day of October, 1986

[SEAL]

*Attest:*

DONALD J. QUIGG

*Attesting Officer*

*Commissioner of Patents and Trademarks*